(12) United States Patent
Palakollu (10) Patent No.: US 12,276,802 B2
(45) Date of Patent: Apr. 15, 2025

(54) VIRTUAL REALITY HEADSET

(71) Applicant: Vamsee Krishna Palakollu, Feltham (GB)

(72) Inventor: Vamsee Krishna Palakollu, Feltham (GB)

(*) Notice: Subject to any disclaimer, the term of this patent is extended or adjusted under 35 U.S.C. 154(b) by 45 days.

(21) Appl. No.: 18/015,012

(22) PCT Filed: Jul. 6, 2021

(86) PCT No.: PCT/GB2021/051713
§ 371 (c)(1),
(2) Date: Jan. 6, 2023

(87) PCT Pub. No.: WO2022/008895
PCT Pub. Date: Jan. 13, 2022

(65) Prior Publication Data
US 2023/0258946 A1    Aug. 17, 2023

(30) Foreign Application Priority Data

Jul. 6, 2020  (GB) .................................... 2010326

(51) Int. Cl.
*G02B 27/01* (2006.01)
*G02B 27/00* (2006.01)
(Continued)

(52) U.S. Cl.
CPC ..... *G02B 27/0176* (2013.01); *G02B 27/0093* (2013.01); *G02B 27/0101* (2013.01);
(Continued)

(58) Field of Classification Search
CPC ............ G02B 27/0176; G02B 27/0093; G02B 27/0101; G02B 27/0149;
(Continued)

(56) References Cited

U.S. PATENT DOCUMENTS 5,003,300 A * 3/1991 Wells ................. G02B 27/0176
                                                340/980
6,809,792 B1 * 10/2004 Tehranchi ............ H04N 19/467
                                                352/85

(Continued)

FOREIGN PATENT DOCUMENTS

JP     2017-108302      6/2017

OTHER PUBLICATIONS

International Search Report and Written Opinion mailed Dec. 20, 2021 for International application No. PCT/GB2021/051713.

(Continued)

*Primary Examiner* — Michael J Jansen, II
(74) *Attorney, Agent, or Firm* — Lippes Mathias LLP (57) ABSTRACT

The present disclosure relates to a virtual reality headset (1) that is configured to monitor the presence and identity of a viewer (4). The virtual reality headset (1) is provided with at least one iris scanner (16) that is switchable between a stowage configuration in which the iris scanner does not obstruct the user's view of a video display system (12) and a deployed configuration in which the iris scanner is able to scan an iris of the viewer. The iris scanner (16) may be switched between the stowage and deployed configurations by moving the iris scanner and/or at least a portion of the video display system (12) relative to a housing (2) of the virtual reality headset (1). The virtual reality headset (1) is further configured to display an ID code (30) associated with the viewer (4) split up into a plurality of ID code fragments (31) across the video display system (12).

20 Claims, 4 Drawing Sheets

(51) Int. Cl.
*G06F 1/16* (2006.01)
*G06F 21/32* (2013.01)
*G06V 40/19* (2022.01)

(52) U.S. Cl.
CPC ......... *G02B 27/0149* (2013.01); *G06F 21/32* (2013.01); *G06V 40/19* (2022.01); *G02B 2027/0138* (2013.01); *G02B 2027/0156* (2013.01); *G06F 1/163* (2013.01)

(58) Field of Classification Search
CPC .... G02B 2027/0138; G02B 2027/0156; G02B 27/017; G06F 21/32; G06F 1/163; G06F 3/011; G06V 40/19; G06V 10/94
See application file for complete search history.

(56) References Cited

U.S. PATENT DOCUMENTS

| | | | | |
|---|---|---|---|---|
| 6,810,480 | B1* | 10/2004 | Parker | G06F 21/32 713/168 |
| 7,724,210 | B2* | 5/2010 | Sprague | G02B 27/0172 345/32 |
| 8,824,749 | B2* | 9/2014 | Leyvand | G06F 21/32 382/104 |
| 9,274,599 | B1* | 3/2016 | D'Amico | G06F 3/013 |
| 9,507,155 | B2* | 11/2016 | Morimoto | G02B 27/017 |
| 9,525,911 | B2* | 12/2016 | Atkin | H04N 21/64322 |
| 9,600,069 | B2* | 3/2017 | Publicover | G06V 40/19 |
| 9,619,195 | B2* | 4/2017 | Shadle | G06F 3/14 |
| 9,979,547 | B2* | 5/2018 | Starner | H04L 9/3231 |
| 10,338,400 | B2* | 7/2019 | Connor | G02B 27/0172 |
| 10,444,800 | B2* | 10/2019 | Sullivan | G06F 1/163 |
| 10,713,831 | B2* | 7/2020 | Arana | G06T 11/60 |
| 10,754,150 | B2* | 8/2020 | Chung | G09F 9/30 |
| 10,769,433 | B2* | 9/2020 | Nowak | G06F 21/32 |
| 10,848,753 | B1* | 11/2020 | Cavin | H04N 13/383 |
| 11,116,395 | B1* | 9/2021 | Gur | A61B 3/12 |
| 11,238,143 | B2* | 2/2022 | Fletcher | G06V 40/197 |
| 11,504,051 | B2* | 11/2022 | Krueger | A61B 5/163 |
| 11,513,591 | B2* | 11/2022 | Koo | G06V 40/19 |
| 11,580,782 | B2* | 2/2023 | Wang | H10K 59/38 |
| 11,934,571 | B2* | 3/2024 | Rana | G06V 40/18 |
| 2004/0008157 | A1* | 1/2004 | Brubaker | G02B 27/017 345/8 |
| 2005/0264502 | A1* | 12/2005 | Sprague | G02B 27/0172 348/E5.145 |
| 2012/0257797 | A1* | 10/2012 | Leyvand | A63F 13/40 382/118 |
| 2013/0249778 | A1* | 9/2013 | Morimoto | G02B 27/0176 345/8 |
| 2014/0282868 | A1* | 9/2014 | Sheller | G06F 21/316 726/3 |
| 2014/0337634 | A1* | 11/2014 | Starner | H04W 12/33 713/186 |
| 2015/0123887 | A1* | 5/2015 | Shadle | G06F 3/14 345/102 |
| 2015/0281774 | A1* | 10/2015 | Atkin | H04N 21/64322 725/14 |
| 2015/0326570 | A1* | 11/2015 | Publicover | G06V 40/197 382/117 |
| 2016/0342835 | A1* | 11/2016 | Kaehler | G06V 40/19 |
| 2017/0061438 | A1* | 3/2017 | Patel | G06Q 20/326 |
| 2017/0103440 | A1* | 4/2017 | Xing | H04W 12/06 |
| 2017/0115742 | A1* | 4/2017 | Xing | G06F 3/0485 |
| 2017/0364920 | A1* | 12/2017 | Anand | H04L 63/0861 |
| 2018/0137354 | A1* | 5/2018 | Nowak | G06F 3/013 |
| 2018/0267575 | A1* | 9/2018 | Sullivan | G02B 26/02 |
| 2019/0004325 | A1* | 1/2019 | Connor | G02B 27/0172 |
| 2019/0361230 | A1* | 11/2019 | Chung | G09F 9/30 |
| 2019/0370450 | A1* | 12/2019 | Fletcher | G06V 40/197 |
| 2020/0027257 | A1* | 1/2020 | Arana | G06T 11/60 |
| 2021/0191511 | A1* | 6/2021 | Koo | G02B 27/0093 |
| 2021/0255698 | A1* | 8/2021 | Rana | G06T 7/73 |
| 2021/0307605 | A1* | 10/2021 | Gur | G02B 26/101 |
| 2021/0357638 | A1* | 11/2021 | Wang | G02F 1/133514 |
| 2022/0133212 | A1* | 5/2022 | Krueger | A61B 3/0041 600/301 |
| 2022/0311763 | A1* | 9/2022 | Krishan | H04L 63/0853 |
| 2023/0078832 | A1* | 3/2023 | Wiegman | G06N 20/00 703/8 |
| 2023/0153810 | A1* | 5/2023 | Spender | G06Q 20/3278 705/44 |

OTHER PUBLICATIONS

British Search Report dated Nov. 9, 2021 for UK Application No. GB 2109755.5.

* cited by examiner

VIRTUAL REALITY HEADSET

The present invention relates to a virtual reality (VR) headset for enabling a wearer of the headset to view video, in particular movies, through the headset.

Known VR headsets generally comprise a housing in which right and left eye lenses are mounted, and one or two LCD screens that are viewable through the eye lenses. A strap is provided for securing the housing on the head of the wearer so that the wearer can look through the lenses and view the screens. Video, in the form of for example movies, TV series or games, is streamed from a console, personal computer, laptop or smart phone to the or each screen for the wearer to watch through the lenses while the housing is secured to his/her head.

However, currently, it is only possible to watch new release movies at the time of their release by purchasing a ticket for a particular movie and going to the cinema (movie theatre). It would be preferable if new release movies could be watched at the time of their release in the comfort of your own home without having to go to a cinema. However, there are a number of obstacles to allowing VR headset users to do this. Firstly, the technology and set-up is expensive, and it is also difficult to manage and deliver new release movies via online streaming centrally. Secondly, it is not currently possible to control how many people would watch the new release movie, and hence the pricing of the movie is not quantifiable. Thirdly, there is the need to guard against piracy, when movies are illegally recorded and uploaded online, which causes substantial damage to revenue for the movie makers.

Currently, there are no VR systems that would solve all of the above problems in one system.

It is therefore an object of the present invention to provide a VR headset which solves these problems so as to enable new release movies to be watched at the time of release of the movie without having to go to the cinema.

A first aspect of the present invention provides a virtual reality headset comprising a housing including right and left eye lenses and a video display system, the headset being arranged to be held adjacent the eyes of a viewer so that the viewer can view a video being displayed on the video display system through the lenses, the headset further comprising at least one iris scanner, wherein the headset is provided with an actuation system that is configured to effect relative movement between the iris scanner and at least a portion of the video display system in order to switch the iris scanner between a stowage configuration in which the iris scanner does not obstruct the user's view of the video display system and a deployed configuration in which the iris scanner is configured to scan an iris of the viewer while the viewer is using the headset.

It will be appreciated that the virtual reality headset may include a pair of iris scanners each configured to scan one of the viewer's eyes, and that each of the iris scanners may be configured to be switched between a stowage configuration and a deployed configuration in a similar manner.

By providing the virtual reality headset with at least one iris scanner that is configured to be switched between a stowage configuration and a deployed configuration, the virtual reality headset of the present invention is able to obtain accurate and reliable iris scans during use of the headset for comparison with pre-stored iris data for identity verification purposes, while also enabling unobstructed viewing of video content when the iris scanner is not in use. In some cases the iris scanner may be positioned at least substantially directly in front of the viewer's iris in line with the viewer's gaze direction at least while in the deployed configuration, although in other cases the iris scanner may be configured to scan the viewer's iris from an angle, as set out in more detail below.

The actuation system may be configured to move the iris scanner with respect to the headset housing in order to switch the iris scanner between the stowage configuration and the deployed configuration. In this case it is not necessary for any portion of the video display system to be movable with respect to the housing, and the entire video display system may remain in a fixed position when the iris scanner is switched between the stowage configuration and the deployed configuration.

The actuation system may be configured to move the iris scanner in a direction towards an eyeline of the viewer when switching the iris scanner from the stowage configuration to the deployed configuration; and to move the iris scanner in a direction towards an edge, for example a side edge, of the headset housing when switching the iris scanner from the deployed configuration to the stowage configuration.

Alternatively, or in addition, the actuation system may be configured to move at least a portion of the video display system with respect to the headset housing in order to switch the iris scanner between the stowage configuration and the deployed configuration. In this case it is not necessary for the iris scanner to be movable with respect to the housing, and the iris scanner may instead remain in a fixed position while being switched between the stowage configuration and the deployed configuration.

The video display system may comprise at least one movable screen portion that is movable relative to at least one fixed screen portion in order to switch the iris scanner between the stowage configuration and the deployed configuration. The movable screen portion may, for example, be slidable or pivotable relative to the fixed screen portion in order to uncover the iris scanner to thereby switch the iris scanner into the deployed configuration. The movable screen portion is preferably smaller than the fixed screen portion, and may be embedded within or provided at an edge of the fixed screen portion.

The headset may comprise a user operable control element that is configured to be operated by a user in order to switch the iris scanner between the stowage configuration and the deployed configuration. The user operable control element may, for example, comprise a slider, a lever, a button or a switch.

The user operable control element may be configured to drive a mechanical link mechanism in order to switch the iris scanner between the stowage configuration and the deployed configuration. The mechanical link mechanism may, for example, comprise a single link element that rigidly connects the iris scanner to a slider or lever mounted on the headset housing, although more complex mechanical link mechanisms are also possible, including mechanisms comprising multiple articulated link elements.

The actuation system may comprise an electric motor that is operable to switch the iris scanner between the stowage configuration and the deployed configuration. The electric motor may, for example, comprise a rotary or linear actuator, which may be configured to move the iris scanner or alternatively at least a portion of the video display system via any suitable link mechanism.

The electric motor may be configured to switch the iris scanner between the stowage configuration and the deployed configuration in response to operation of the user operable control element.

Alternatively, or in addition, the electric motor may be configured to switch the iris scanner between the stowage configuration and the deployed configuration in response to receipt of an automatically generated control signal. The control signal may be generated either on-board the virtual reality headset or alternatively on a remote device or server that is in communication with the virtual reality headset. The control signal may be generated at a predetermined or random time interval and/or in response to detection of an event, for example the virtual reality headset being placed on a user's head or a user attempting to play video content on the virtual reality headset.

The iris scanner may be configured to be at least substantially aligned with the viewer's iris at least when in the deployed configuration. For example, the iris scanner may be positioned (or movable into a position) within the housing such that it is able to scan the viewer's iris at an angle of no more than 10 degrees, preferably no more than 5 degrees, from the viewer's gaze direction while the viewer is looking straight ahead at the video display system.

The iris scanner may be a side gazing iris scanner. It will be appreciated that a side gazing iris scanner is an iris scanner that is specifically designed for performing iris scans from an angle without being aligned with a user's gaze direction. Using a side gazing iris scanner advantageously allows accurate and reliable iris scans to be obtained without the iris scanner having to be aligned with the viewer's iris. For example, where a side gazing iris scanner is used, the iris scanner may be positioned (or movable into a position) within the housing such that it is able to scan the viewer's iris at an angle greater than 10 degrees from the viewer's gaze direction. However, for optimum scanning performance, the scanning angle is preferably still no greater than 30 degrees, and more preferably no greater than 20 degrees.

The eye lens through which the iris scanner is configured to scan the viewer's iris may be adapted to correct side gazing aberrations.

The headset may be configured, before allowing a viewer to watch video content, to require a scan of the viewer's iris to be performed using the iris scanner, to verify that the iris scan matches pre-stored iris data associated with a user account via which the video content was purchased and/or pre-stored iris data associated with an e-ticket for the video content, and to allow the video content to play if the iris scan matches the pre-stored iris data.

The headset may be configured, before allowing a viewer to watch video content, to require an initial scan of the viewer's iris to be performed using the iris scanner, to store the initial iris scan locally on the headset, to subsequently require further iris scans to be performed using the iris scanner while the video content is playing, and to compare the subsequent iris scans to the initial iris scan in order to verify that the video content is still being viewed by the same viewer. In this way the headset may be able to verify that it is still being used by the same viewer that initiated a viewing session without communicating iris scan data to any external device.

The headset may further comprise a fingerprint scanner for scanning a finger of the viewer. The fingerprint scanner may be configured to compare fingerprint scans with pre-stored fingerprint data for identity verification purposes. The fingerprint scanner may be provided on the housing of the headset, or alternatively on a separate hand-held device associated with the headset.

The headset may also include a proximity sensor for monitoring the distance between the viewer and the headset when the headset is being used. The proximity sensor may comprise an IR sensor for emitting an IR signal to a point between the eyes of the viewer using the headset so as to determine the distance between the eyes of the viewer and the headset. This enables the presence of the viewer to be monitored during the playing of the video.

The headset may also include a pulse sensor for sensing the pulse of the viewer to check that the headset is being held adjacent the eyes of the viewer. The headset preferably also includes a strap for securing the headset on the head of the viewer, and the pulse sensor may be provided on the strap.

The headset may be configured to stop playing video content if the proximity sensor or pulse sensor detect that the viewer is no longer wearing the headset.

The headset may also include a camera arranged to take photos to check whether a recording of the video display is taking place. The IR sensor may be arranged to detect a recording of a video display which uses IR lights. This can help to guard against the illegal recording of the video being played in case a user is able to circumvent the proximity and pulse sensors.

A further aspect of the present invention provides a virtual reality headset comprising a housing including right and left eye lenses and a video display system, the headset being arranged to be held adjacent the eyes of a viewer so that the viewer can view a video being displayed on the video display system through the lenses, the headset further comprising at least one side gazing iris scanner that is located in a position in which it does not obstruct the user's view of the video display system and configured to scan an iris of the viewer while the viewer is using the headset. The side gazing iris scanner may, for example, be located above, below, or to the side of the video display system. The use of a side gazing iris scanner provides an alternative solution for obtaining accurate and reliable iris scans during use of a virtual reality headset while also enabling unobstructed viewing of video content. The eye lens through which the iris scanner is configured to scan the viewer's iris may be adapted to correct side gazing aberrations.

The present invention also provides a method of operating a virtual reality headset comprising at least one iris scanner and/or at least one fingerprint scanner, the method comprising operating the iris scanner and/or the fingerprint scanner at random times during viewing of a video being displayed on a video display system of the virtual reality headset so as to monitor the identity and/or presence of the viewer. The method may be used when operating a virtual reality headset as described above in connection with earlier aspects of the present invention.

The method may comprise the steps of; (a) scanning the iris and/or fingerprint of a user of the headset and storing the scanned data so as to provide an identification of the user; (b) providing the user with an e-ticket to view a video; (c) streaming the video to the headset; (d) scanning the fingerprint and/or iris of the user at random times during the streaming and checking the scan against the stored data for the identification of the user; and (e) stopping the streaming if the scan does not match the stored data.

The method may also include the steps of: (a) emitting an IR signal from an IR sensor to check the distance between the eyes of the user and the headset; (b) using a head strap sensor to ensure that the headset is being worn by the user; (c) using a camera to take photos to check if a recording of the video is taking place; and (d) displaying an ID code relating to the identity of the user on the video display system so that the ID code appears on any recording and the user can be identified by the recording.

A further aspect of the present invention provides a virtual reality headset comprising a housing including right and left eye lenses and a video display system, the headset being arranged to be held adjacent the eyes of a viewer so that the viewer can view a video being displayed on the video display system through the lenses, wherein the video display system is configured, while playing video content, to display an ID code that is associated with a user account via which the video content was purchased and/or with an e-ticket for the video content, with the ID code being split up into a plurality of fragments and displayed at multiple different locations on one or more screens of the video display system. The ID code may be used to determine the identity of a user who is responsible for making an illegal recording of video content from the headset, either using a camera device separate to the VR headset or by intercepting video data that is being streamed by the device.

By splitting the ID code up and displaying it at multiple different locations on the screen(s) of the video display system it becomes much more difficult for users to remove the ID code from footage that has been illegally recorded from the VR headset compared to a standard ID code that is displayed at a single location on a display screen.

The ID code preferably includes a customer ID associated with a user account, and may further include a date and/or country code.

The ID code may be split into any suitable number of fragments, for example four or more fragments. Each ID code fragment may include a single character of the ID code, or alternatively multiple characters of the ID code. In one preferred embodiment the ID code includes 18 characters and is split into 9 fragments each including 2 characters, although other numbers of characters and fragments are also possible.

The ID code is preferably distributed across a significant portion of the screen(s) of the video display system, more preferably across substantially the entire extent of the screen(s) of the video display system, and may be displayed continuously while the video content is being played.

The screen(s) of the video display system may be divided into a plurality of display regions, and the video display system may be configured to display one of the ID code fragments in each of the display regions. The display regions may, for example, form a grid that extends across the screen(s). In this way the order of the characters of the ID code may be readily determined while still allowing the ID code to be split up and displayed in a manner that makes the ID code difficult to remove from illegally recorded footage.

The video display system may be configured to display each of the ID code fragments at a randomly selected location within its respective display region, and to change the location of each of the ID code fragments within its respective display region over time. In this way the difficulty of removing the ID code from illegally recorded footage may be further increased.

A further aspect of the present invention provides a method of displaying an ID code associated with video content on a virtual reality headset, the method comprising splitting the ID code up into a plurality of fragments, and displaying the ID code fragments at multiple different locations on a screen of the headset while using the screen to display the video content.

The method may further comprise dividing the screen into a plurality of display regions, and displaying one of the ID code fragments in each of the display regions.

The method may further comprise displaying each ID code fragment at a randomly selected location within its respective display region, and changing the location of each ID code fragment within its respective display region over time.

The VR headset of the present invention may be used in combination with a mobile or web-based application, where users can register, and then create and manage their identity and ticket purchases. The app can be operated through a Secure Streaming Server from which the content of movies can be delivered in agreement with the movie makers, a multiplex cinema chain, distributors or an online streaming company which has a streaming licence.

In this way, the VR headset can be used to enable an individual user to pay for and watch a new release movie in their own home at the time of release, without going to the cinema and without loss of revenue for the movie providers.

It will be appreciated that the above described aspects of the present invention may be combined in any suitable manner.

The invention will now be described in more detail with reference to the accompanying drawings, in which.

Figure 1:
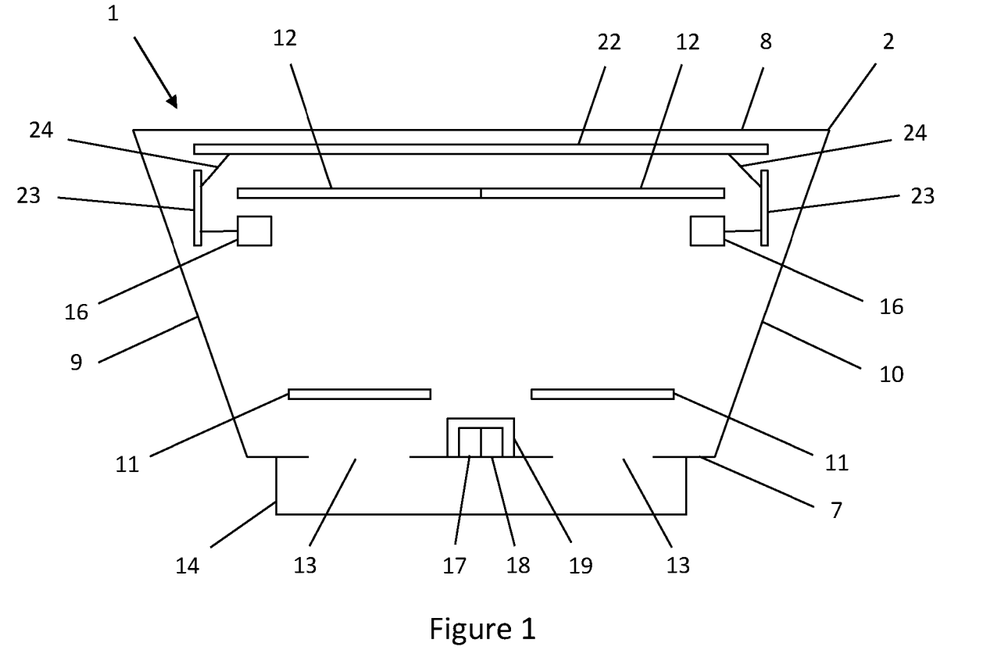
FIG. 1 schematically illustrates a plan view of a VR headset according to one possible embodiment of the present invention.
Figure 2:
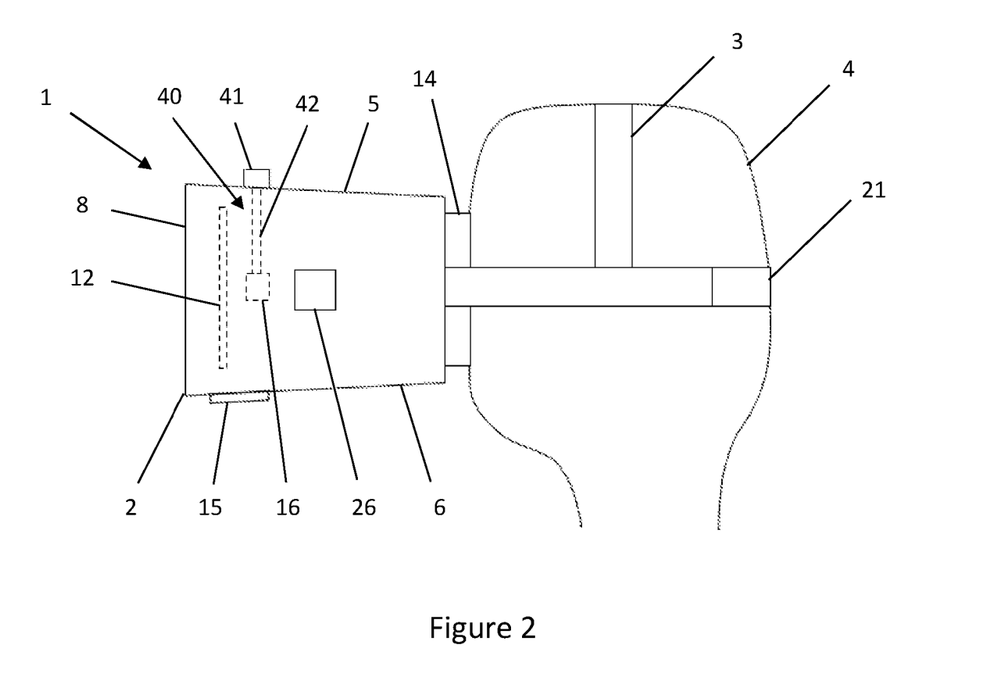
FIG. 2 schematically illustrates the headset of FIG. 1 attached to a user's head.
Figure 3:
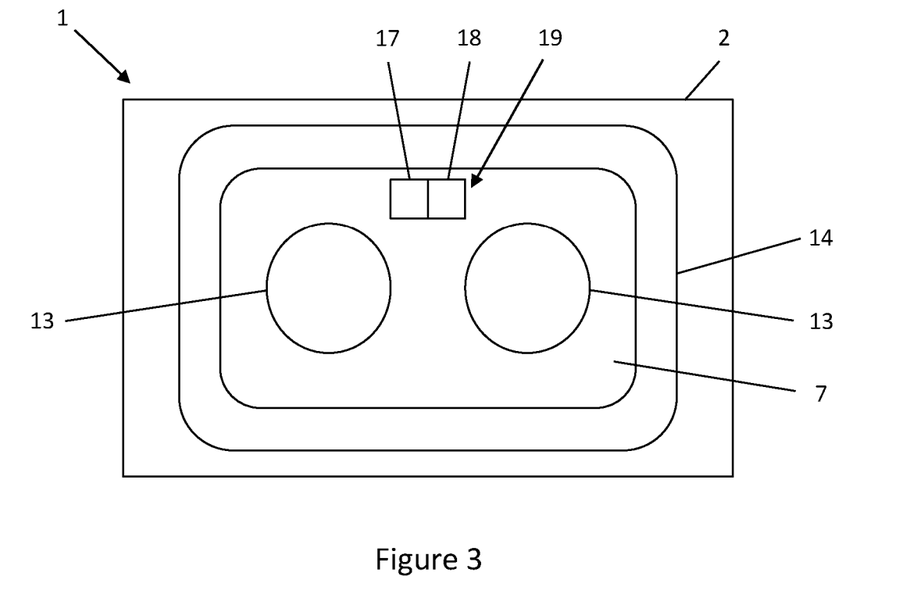
FIG. 3 schematically illustrates the user-facing end of the headset of FIG. 1.

Referring now to FIGS. 1 to 3, an embodiment of a virtual reality (VR) headset 1, according to the present invention, comprises a housing 2 and a strap 3 for securing the housing 2 to the head 4 of a viewer. The housing 2 comprises an upper side 5, an under side 6, and an eye facing end 7, a remote end 8, and a pair of side edges 9, 10.

The housing 2 accommodates right and left eye lenses 11, a video display system including two display screens 12, such as LCD, each for viewing through a respective lens 11, and eye apertures 13 against which the eyes of the viewer are placed so as to view each screen 12 through the lenses 11. At the eye facing end 7 of the housing 2, there is a cushion 14 which is pressed against the face of the viewer and surrounds the eyes of the viewer when the headset 1 is being used.

On the underside 6 of the housing 2, there is provided a finger print scanner 15, and two iris scanners 16 are provided inside the housing 2. These scanners 15, 16 can be used to check the fingerprint and irises of the viewer to determine the identity of the viewer, as explained below. The housing 2 also comprises an infra-red (IR) sensor 17 as a proximity sensor, and a camera 18. Both of the IR sensor 17 and camera 18 are preferably positioned on the eye facing end 7 of the housing 2 in a sensor zone 19 positioned between the eye apertures 13.

One or more head sensors 21 are incorporated into the head strap 3, preferably in the form of a pulse sensor strip, to check that the strap 3 is wrapped around the head 4 of the viewer.

All of the fingerprint scanner 15, iris scanners 16, IR sensor 17, camera 18 and head sensor 21 are connected to the motherboard 22 of the headset 1 via their own pcbs 23, as shown in FIG. 1 for the iris scanners 16. The pcbs 23 are connected to the motherboard 22 via flexible power supply cables 24 and 5 pin connectors.

In one example, each iris scanner works between 3.4V-6V, and the electrical commands are processed via the circuit on the mother board. This scanner can contain an IR filter (not shown) and camera assembly (not shown) that can carry out side gazing. It also has the following technical features:
Image Resolution:
ISO Standard 19794-6 (2005 & 2011), (640×480 pixels, 8 bit Grayscale), Full support of K1 (original captured image), K2 (uploaded image), K3 (cropped image), K7 (cropped and masked image).
Sensor Resolution: Pixel Density: Focal Distance:
VGA (Video Graphics Display) Normally greater than 210 pixels across iris diameter 13.75 cm~15.25 cm (5.6 inches~6.0 inches) from the front of the camera.
Optimal Distance: Field of View (FOV):
Lens. 14.5 cm (5.7 inches), Focal depth=1.5 cm (0.6 inch)
About 3.3 cm×2.4 cm at 14.5 cm (1.3 inches×0.9 inches at 5.7 inches)
Eye Safety Compliance:
Eye safety (IEC 62471:2006-07)
RoHS (Restriction of Hazardous Substances).

The fingerprint scanner preferably has a power supply of 3.6V-7.5V.

In another embodiment of the invention, the VR headset may be associated with a separate hand held device (not illustrated), and the fingerprint scanner 15 may be provided on the hand held device instead of being provided on or in the housing 2.

Controls 26 to activate and operate the headset 1 can be provided on a side 9, 10 of the housing 2, or on the hand-held device, if present.

The VR headset is used in combination with a mobile or web-based application on a laptop, home desktop computer or mobile phone, where users can register and then create and manage their identity and ticket purchases. The app can be operated through a Secure Streaming Server from which the content of movies can be delivered in agreement with the movie makers, a multiplex cinema chain, distributors or an online streaming company which has a streaming licence. Software from the web/mobile application interacts with the sensors/scanners of the headset and achieves the operation as set out below.
Operation/use of the headset in a preferred example is as follows.
1 Registration User registration is done via web or mobile app. The user opens the application in a browser (for example say www.inperta.com), clicks on the "Register" link, and fills in their details.

The user is asked to add his iris scan images using a scanner and the scanned data is stored by the software associated with the headset so as to add the iris scanned data to the registration of his identification details. This is done either through the iris scanner 16 of the headset or the iris scanner of a laptop or other computer device.

The user is also asked to use the fingerprint scanner 15 and the scanned fingerprint data is stored by the software associated with the headset so as to add his fingerprint scanned data to the registration of his identification details.
2. Activation Once the user has registered the iris and fingerprint details, an email is sent to the given email address, and once the user verifies the email, an account is activated.

3. Payment

The user can add their payment card details and mobile phone number for alerts, which can then be used to purchase tickets. A third party payment gateway is used to process payments as per industry standards.
4. Tickets The registered user can then view the available movies, and buy an e-ticket to watch one of them. While buying the e-ticket, the registered iris and fingerprint details are linked to the e-ticket. An e-ticket is treated as a standard movie ticket, to watch the movie once and only for the user whose stored identification data is linked to the e-ticket.
5. Watch Movie Once the user has purchased an e-ticket online, the user takes his headset and attaches it to his head. The app can be started by using the controls 26 on the housing or on the handheld device if provided. The home screen is displayed and the user can go to his registered accounts and select an e-ticket. The headset then requires iris and fingerprint scans to be performed using the iris and fingerprint scanners 15, 16 for comparison with the iris and fingerprint data associated with the e-ticket before allowing the selected movie to play. Once all of the data matches, the user can start the movie. While playing, the user can pause the movie for one or more short periods, for example twice for 5-10 mins each. The headset may then require iris and fingerprint scans to be performed for comparison with the iris and fingerprint data associated with the e-ticket before allowing the movie to restart. The iris and fingerprint scanners may also carry out checks against the stored data of the identity and the presence of the viewer at random intervals during the movie. If the checks do not match the stored data or indicate that the viewer has moved away from the headset, the movie is stopped.
6. Security While the movie is played, anti-piracy monitoring is achieved by the following sensors.
(i) The IR sensor 17 monitors the distance between the viewer and the headset continuously when the headset is being used to verify the continued presence of the viewer.
(ii) The pulse sensors 21 in the straps around the head of the wearer are used to sense pulse notifications, to make sure the strap is wrapped around the head of the viewer. This is to monitor the presence of the viewer, but is not linked to their identity.
(iii) The camera 18 captures images of the view point, at random intervals, and the images are verified by Machine Learning & Artificial Intelligence APIs to identify any cameras/recorders making a copy of the movie being watched.
(iv) The IR sensor 17 may also be used to detect any cameras or infrared lights in the view point, indicating that a recording of the movie is taking place.

Any changes in (i) to (iv) above will pause the movie and trigger checks of the identity of the viewer using the fingerprint and iris scanners 15, 16, which must be passed before the headset will restart playing the movie. Any changes detected by (iii) or (iv) will stop the movie and report the identity of the viewer to an associated administration.

The above-described measures are generally sufficient to prevent a user from being able to make any illegal recording of video content that is being played on the VR headset 1. However, as an additional measure to prevent illegal recordings, the VR headset 1 is further configured to continuously display an ID code 30 associated with the user account via which the video content was purchased and/or the e-ticket for the video content on top of the video content while the video content is being played, from which it is possible to identify the user if they manage to obtain an illegal recording of the video content.

Figure 4:
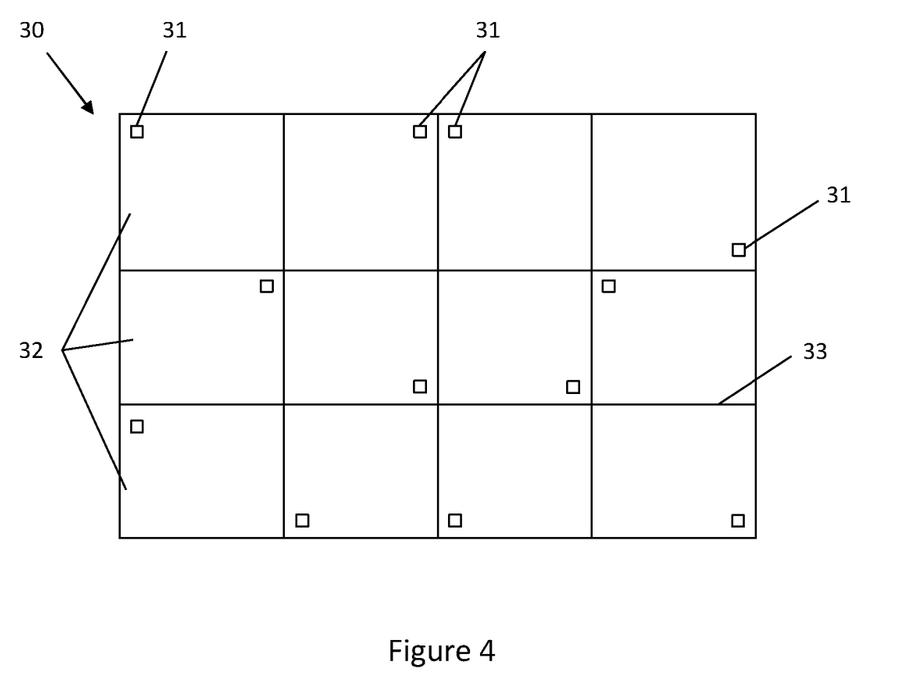
FIG. 4 schematically illustrates a display screen of the headset of FIG. 1 with an ID code being displayed over video content.

In accordance with the present invention, the ID code 30 is split up into multiple ID code fragments 31, and each of the ID code fragments 31 is displayed in a different section 32 of a grid 33 that extends across the display screens 12 of the VR headset 1, as shown in FIG. 4. Each of the ID code fragments 31 is displayed at a randomly selected position in its respective grid section 32, and moved to different locations within its respective grid section 32 over time in order to prevent removal of the ID code fragments 31 from any illegal recording of the video content.

The ID code 30 may be transmitted to the VR headset 1 and split up by the headset for display on its display screens 12 over streamed video content, or alternatively pre-embedded in video content that is streamed to the VR headset 1.

FIG. 4 illustrates a display screen 12 of the VR headset 1 displaying an ID code 30 that has been split up into twelve fragments 31 for display. However, it will be appreciated that other numbers of fragments are also possible. For example, in one preferred embodiment the ID code 30 may include a two character date followed by a two character country code for the user and a fourteen character customer ID associated with the user's account, which may be split up into nine ID code fragments each including two characters for display.

In order to ensure that the iris scanners 16 are able to obtain accurate iris scan data without obstructing the user's view of the display screens 12 while video content is being displayed, the VR headset 1 is provided with an actuation system 40 that is configured to switch the iris scanners 16 between a stowage configuration and a deployed configuration. The actuation system 40 comprises a pair of user operable control elements 41 in the form of sliders that are mounted to the housing 2 of the headset 1, as shown in FIG. 2. The iris scanners 16 are mounted to the sliders 41 via rigid links 42 and are configured to be moved with respect to the headset housing 2 when the viewer operates the sliders 41.

Figure 5:
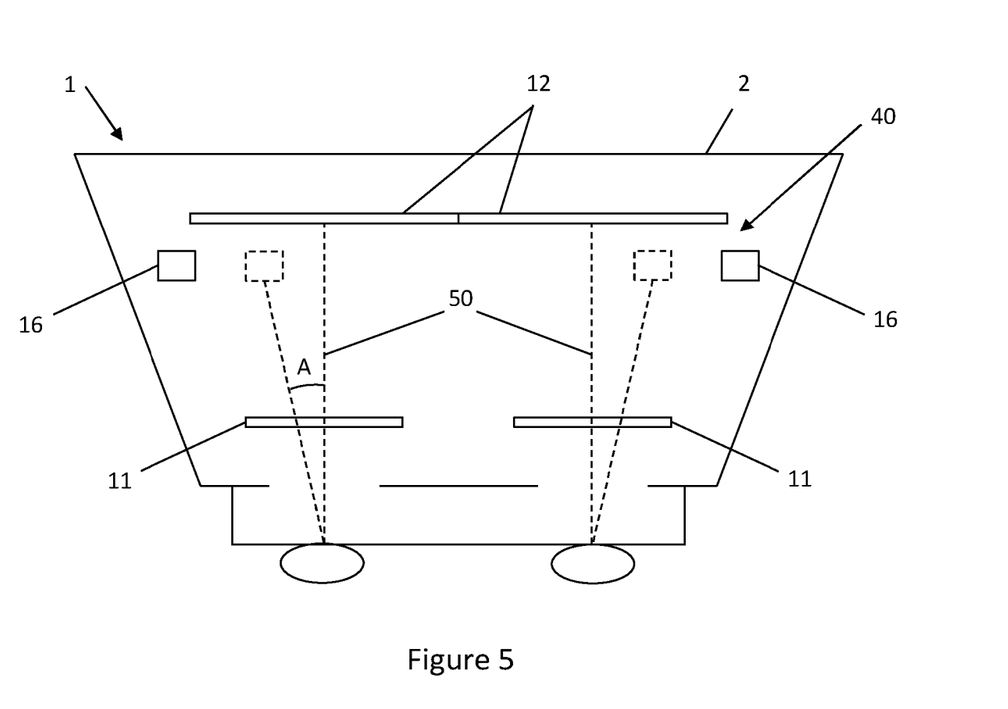
FIGS. 5 to 8 schematically illustrate various different mechanisms for switching iris scanners provided in the headset of FIG. 1 between stowage and deployed configurations.

As shown in FIG. 5, when the iris scanners 16 are not in use, they may be left in a stowage configuration in locations adjacent to the side edges 9, 10 of the headset housing 2 in which they do not obstruct the user's view of the display screens. However, when an iris scan is required, the headset 1 can prompt the user to operate the sliders 41 to move the iris scanners 16 in a direction towards their eyeline 50 in order to switch the iris scanners 16 into a deployed configuration (indicated with dashed lines in FIG. 5) in which the iris scanners 16 are able to scan the user's irises. Once the iris scans have been completed, the user may be prompted to operate the sliders 41 again to move the iris scanners 16 away from their eyeline 50 back towards the side edges 9, 10 of the headset housing 2 into the stowage configuration.

In the embodiment illustrated in FIG. 5 the iris scanners 16 are side gazing iris scanners, and the eye lenses 11 may also be adapted to correct side gazing aberrations. In this case it is not necessary for the iris scanners 16 to be fully aligned with the user's eyeline 50 when in the deployed configuration. Instead, the iris scanners 16 may be configured to scan the user's irises from an angle A of approximately 20 degrees, as shown in FIG. 5. However, in other embodiments the actuation system 40 may instead be configured to move the iris scanners 16 into positions at least substantially directly in front of the user's eyes when switching the iris scanners 16 into the deployed configuration, as shown in FIG. 6, especially in embodiments in which the iris scanners 16 are not designed for side gazing and/or in which the eye lenses 11 are not designed to correct side gazing aberrations.

Figure 6:
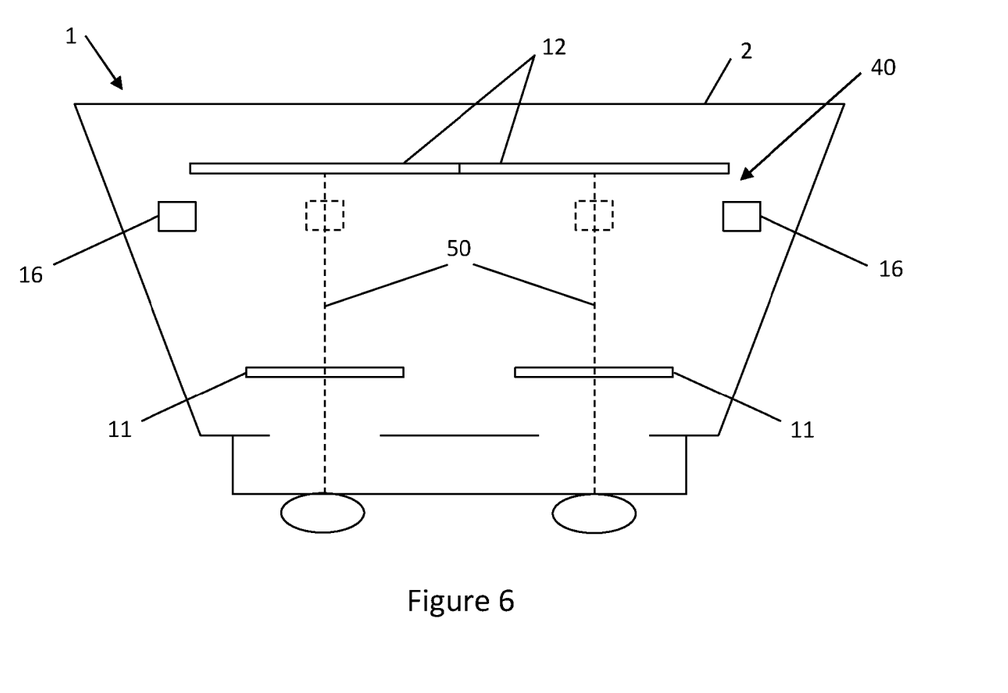
Figure 7:
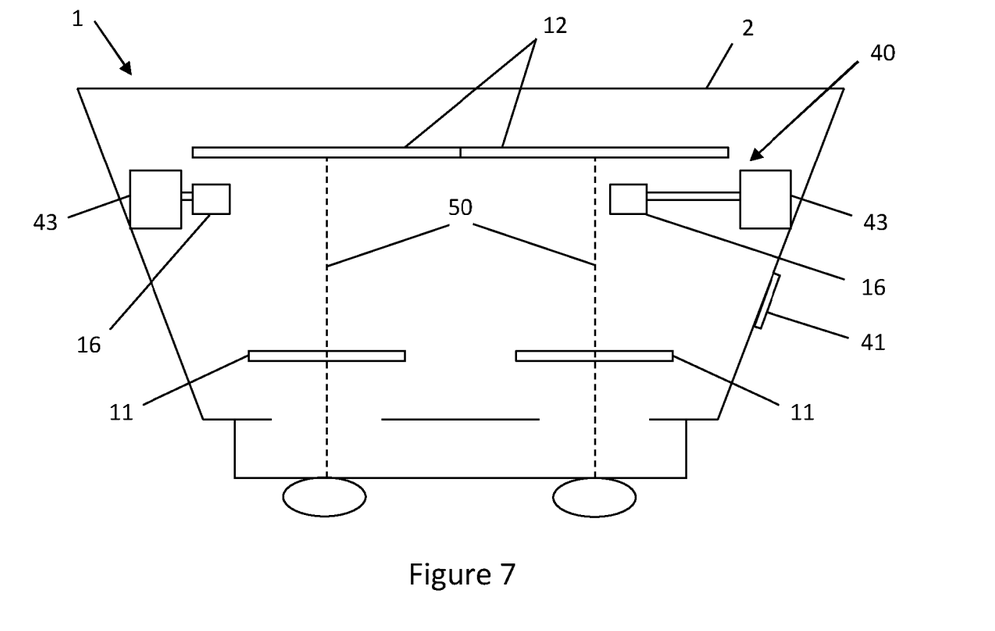

As an alternative to the purely mechanical actuation systems illustrated in FIGS. 5 and 6, the headset 1 may alternatively be provided with an electrical actuation system 40 comprising electric motors 43 that are configured to switch the iris scanners 16 between a stowage state in which they do not obstruct the user's view of the display screens 12 and a deployed state for scanning the user's eyes, as shown in FIG. 7. FIG. 7 shows one of the iris scanners 16 in the stowage configuration and the other iris scanner in the deployed configuration for illustrative purposes, although it will be appreciated that the iris scanners will typically be moved into the stowage configuration or into the deployed configuration at the same time.

The electric motors 43 may be configured to be activated to switch the iris scanners 16 between the stowage configuration and the deployed configuration in response to the user pressing a user operable control element 41 in the form of a button provided on the headset housing 2. In this case the headset 1 may be configured to prompt the user to press the button whenever an iris scan is required. However, in other embodiments the electric motors 43 may be configured to be activated in response to receipt of an automatically generated control signal which may be generated whenever an iris scan is required.

Figure 8:
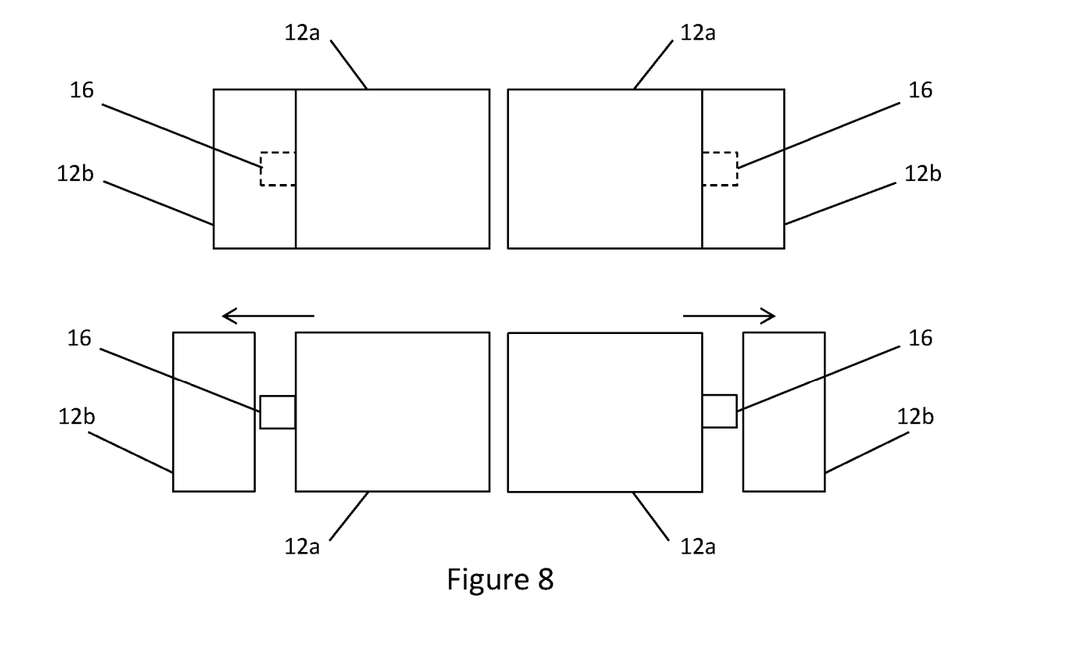

As a further alternative to the above-described actuation systems 40, both of which are configured to move the iris scanners 16 with respect to the headset housing 2 in order to switch the iris scanners 16 between the stowage configuration and the deployed configuration, the headset 1 may alternatively be provided with an actuation system 40 that is configured to move at least a portion of the video display system relative to the housing 2 in order to switch the iris scanners 16 between the stowage configuration and the deployed configuration, as illustrated in FIG. 8.

In this alternative embodiment, each of the display screens 12 of the VR headset 1 comprises a fixed screen portion 12a that is designed to remain fixed with respect to the headset housing 2 and a movable screen portion 12b that is slidable or pivotable relative to the headset housing 2 and the fixed screen portion 12a in order to uncover a fixed iris sensor 16, thereby switching the iris sensor 16 from its stowage configuration to its deployed configuration. The position of the movable screen portion 12b may be controlled by a mechanical link mechanism or alternatively an electric motor in a similar manner to the above described actuation systems with movable iris sensors.

As a final alternative, the iris scanners 16 and display screens 12 may both be configured to remain fixed, with the iris scanners 16 being provided at or in the vicinity of edges of the display screens 12 in order to minimize viewing disruption. In this case adequate scanning performance may be achieved by using side gazing iris scanners and eye lenses that are modified to correct side gazing aberrations. However, it is preferable, where possible, to include an actuation system 40 that is operable to switch the iris scanners 16 between stowage and deployed configurations as described above in connection with FIGS. 5 to 7 order to obtain optimum scanning performance.

In the above-described embodiments, the VR headset 1 is configured to compare iris and fingerprint scans with iris and fingerprint data that is associated with a user account or e-ticket when verifying the identity of the user. However, in another embodiment the VR headset 1 may instead be configured to require an initial scan of the user's irises and fingerprint before allowing video content to play, to store the initial iris and fingerprint scans locally on the headset 1, and to subsequently require further iris and fingerprint scans to be carried out while the video content is playing for comparison with the initial iris and fingerprint scans in order to verify that the video content is still being viewed by the same viewer, in which case it may not be necessary to communicate iris and fingerprint data to any external device.

The advantages of the present invention include the following.

Once a user buys the headset, the user can buy a single ticket for a new release movie at almost the same price as in cinemas/movie theatres, and watch it through the headset at home at the time of its release.

The identity of the user is continuously monitored during a viewing, to provide piracy/theft protection and to make sure the same viewer is watching.

The invention gives a platform to the movie industry globally, which is fading away due to the influx of the subscription based online content platforms.

It gives flexibility to users, who do not to want to pay multiple monthly subscription fees.

Users can buy a ticket for a new release movie and watch it without having to go to cinema at the time of release of the movie.

Online video content platforms also may be forced to follow this pattern and sell tickets per viewing.

The invention is applicable to all of 2D/3D/VR/AR content.

It is applicable not only to the movie industry/online video content platforms, but also to other industries, for example:—
  where there is a need to make sure the viewer/participant is the intended audience,
  where there is a need to make sure content/information is not pirated/compromised,
  where there is a need to check the above multiple times during viewing/interaction in a seamless manner when required or when interrupted.

In a preferred embodiment of the VR headset, according to the invention, there is provided at least one fingerprint scanner, at least one iris scanner, and the proximity sensor. This headset is preferably used in conjunction with a Virtual Reality app installed on the headset, a video streaming platform to manage streaming of videos to the headset, and a software platform to manage the users and their payment and tickets.

Although specific embodiments of the present invention have been described, modifications may be made without departing from the scope of the invention according to the appended claims. For example, there may be one iris scanner for scanning the iris of only one eye of the viewer, or there may be two iris scanners for scanning both eyes of the viewer. The fingerprint scanner may be provided on an alternative position on the housing instead of on the underside. Only one video screen may be provided for the viewer to watch with both eyes. However, it is preferable to provide two screens, one for each eye, to increase the depth of vision and create 3D images. The headset may be used without a head strap with the viewer holding the housing against their eyes/face. All the electronics for the scanners and sensors may be incorporated directly in the motherboard of the headset, instead of on separate pcbs.

Other modifications and variations will also be apparent to the skilled person.

The invention claimed is:

1. A virtual reality headset comprising a housing including right and left eye lenses and a video display system, the headset being arranged to be held adjacent the eyes of a viewer so that the viewer can view a video being displayed on the video display system through the lenses, the headset further comprising at least one iris scanner, wherein the headset is provided with an actuation system that is configured to move the iris scanner with respect to the headset housing in order to switch the iris scanner between a stowage configuration in which the iris scanner does not obstruct the user's view of the video display system and a deployed configuration in which the iris scanner is configured to scan an iris of the viewer while the viewer is using the headset.

2. The headset of claim 1, wherein the actuation system is configured to move the iris scanner in a direction towards an eyeline of the viewer when switching the iris scanner from the stowage configuration to the deployed configuration; and to move the iris scanner in a direction towards an edge of the headset housing when switching the iris scanner from the deployed configuration to the stowage configuration.

3. The headset of claim 1, comprising a user operable control element that is configured to be operated by a user in order to switch the iris scanner between the stowage configuration and the deployed configuration.

4. The headset of claim 3, wherein the user operable control element is configured to drive a mechanical link mechanism in order to switch the iris scanner between the stowage configuration and the deployed configuration.

5. The headset of claim 1, wherein the actuation system comprises an electric motor that is operable to switch the iris scanner between the stowage configuration and the deployed configuration.

6. The headset of claim 5, wherein the electric motor is configured to switch the iris scanner between the stowage configuration and the deployed configuration in response to operation of a user operable control element that is configured to be operated by a user in order to switch the iris scanner between the stowage configuration and the deployed configuration.

7. The headset of claim 5, wherein the electric motor is configured to switch the iris scanner between the stowage configuration and the deployed configuration in response to receipt of an automatically generated control signal.

8. The headset of claim 1, wherein the iris scanner is configured to be aligned with the viewer's iris when in the deployed configuration.

9. The headset of claim 1, wherein the iris scanner is a side gazing iris scanner.

10. The headset of claim 9, wherein the eye lens through which the iris scanner is configured to scan the viewer's iris is adapted to correct side gazing aberrations.

11. The headset of claim 1, wherein the headset is configured, before allowing a viewer to watch video content, to require a scan of the viewer's iris to be performed using the iris scanner, to verify that the iris scan matches pre-stored iris data associated with a user account via which the video content was purchased and/or pre-stored iris data associated with an e-ticket for the video content, and to allow the video content to play if the iris scan matches the pre-stored iris data.

12. The headset of claim 1, wherein the headset is configured, before allowing a viewer to watch video content, to require an initial scan of the viewer's iris to be performed using the iris scanner, to store the initial iris scan locally on the headset, to subsequently require further iris scans to be performed using the iris scanner while the video content is playing, and to compare the subsequent iris scans to the initial iris scan in order to verify that the video content is still being viewed by the same viewer.

13. The headset of claim 6, wherein the operable control element comprises a button provided on the housing.

14. The headset of claim 7, wherein the automatically generated control signal is generated on-board the headset.

15. The headset of claim 7, wherein the automatically generated control signal is generated on a remote device or server that is in communication with the headset.

16. The headset of claim 1, further comprising a fingerprint scanner configured to compare fingerprint scans with pre-stored data for identity verification.

17. A virtual reality headset comprising a housing including right and left eye lenses and a video display system, the headset being arranged to be held adjacent the eyes of a viewer so that the viewer can view a video being displayed on the video display system through the lenses, wherein the video display system is configured, while playing video content, to display an ID code comprising a plurality of characters that is associated with a user account via which the video content was purchased and/or with an e-ticket for the video content, with the ID code being split up into a plurality of fragments each including at least one character of the plurality of characters and displayed at multiple different locations on one or more screens of the video display system.

18. The headset of claim 17, wherein the plurality of fragments comprises nine fragments each including 2 characters.

19. The headset of claim 17, wherein the screen(s) of the video display system are divided into a plurality of display regions, and the video display system is configured to display one of the ID code fragments in each of the display regions.

20. The headset of claim 19, wherein the video display system is configured to display each of the ID code fragments at a randomly selected location within its respective display region and/or to change the location of each of the ID code fragments within its respective display region over time.

* * * * *